United States Patent Office 3,717,673
Patented Feb. 20, 1973

3,717,673
PROCESS FOR THE PREPARATION OF L-DOPA
Luigi Bernardi, Via Pinerolo, and Onofrio Goffredo, Via Cremosano, both of Milan, Italy
No Drawing. Filed Mar. 30, 1971, Ser. No. 129,645
Claims priority, application Italy, Apr. 4, 1970, 22,910/70
Int. Cl. C07c *101/08*
U.S. Cl. 260—519        4 Claims

ABSTRACT OF THE DISCLOSURE

A process for the preparation of L-β-(3,4-dihydroxyphenyl)-alanine (L-Dopa). The process comprises treating L-tyrosine methylester with acetic anhydride at a temperature between 10° and 40° C., for a period of 2-5 hours to give O,N-diacetyl-L-tyrosine methylester. Reacting said O,N-diacetyl-L-tyrosine methylester with aluminum chloride, in the presence of a suitable organic solvent at a temperature between 100° and 150° C. for a period of 2-4 hours to yield β-(3-acetyl-4-hydroxyphenyl)-N-acetyl-L-alanine. Oxidizing said N-acetyl-L-alanine with hydrogen peroxide to yield N-acetyl-L-Dopa. Hydrolyzing said N-acetyl-L-Dopa with a hot inorganic acid to yield L-β-(3,4-dihydroxyphenyl)-alanine.

---

Our present invention relates to a new process for the preparation of L-Dopa.

L-Dopa, the generic name given to L-3,4-dihydroxyphenylalanine, is a product known in literature, has a remarkable activity in the treatment of Parkinson's diasease. Many methods for preparing L-3,4-dihydroxyphenylalanine are also known.

The present invention has, among its objects a new process whereby one is able, surprisingly, to obtain the product in active form and in high yields.

One process offers the twofold advantage of producing L-Dopa free from undesired side products and therefore highly pure, while starting from a compound obtained easily by employing a sequence of reactions readily performable.

The process of the present invention, which will be described in detail hereinbelow, consists mainly in treating L-tyrosine methylester with acetic anhydride to form O,N-diacetyl-L-tyrosine-methylester which, in the presence of aluminum chloride, is converted to L-β-(3-acetyl-4-hydroxyphenyl)-N-acetyl-alanine. Oxidation of this product gives N-acetyl-L-Dopa, which may be easily hydrolyzed to obtain L-3,4-dihydroxyphenylalanine.

The process of the present invention may be represented by the following scheme:

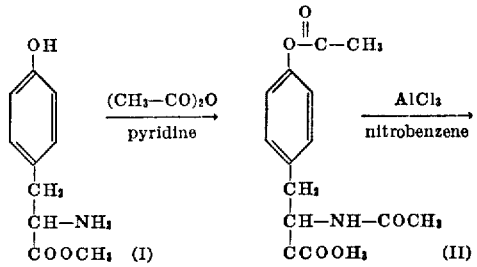

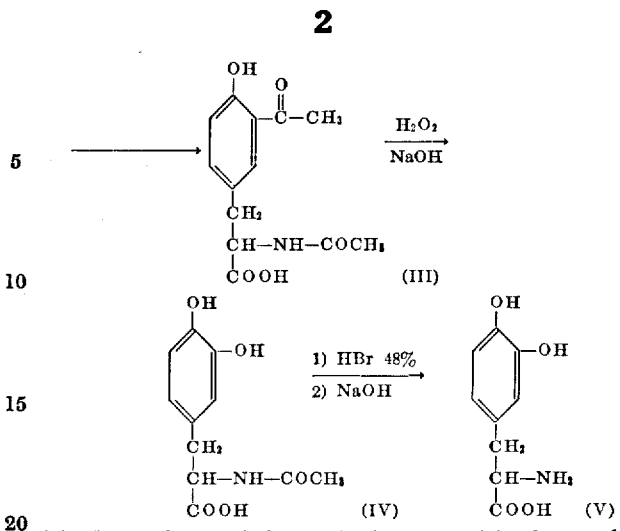

The L-tyrosine methylester (I) is prepared in the usual manner, employing a simple esterfication reaction. The compound obtained is reacted with acetic anhydride in the presence of pyridine, while maintaining the temperature at between 10° and 40° C. The reaction is then continued for a period of from 2 to 5 hours under continuous stirring. The O,N-diacetyl-L-tyrosine methylester (II) tends to crystallize already by evaporation of the solvent, and then it is purified by crystallization.

The diacetylderivative, dissolved in a suitable solvent such as nitrobenzene or chlorobenzol, is subsequently added with anhydrous aluminum chloride, and the temperature is adjusted to between 100° and 150° C., for a period of 2-4 hours. Water is added to remove the complex with aluminum chloride, then the solvent and the aluminum hydrate formed are discarded, supplying good yields of L-β-(3-acetyl-4-hydroxy-phenyl)N-acetylalanine (III). This product is solubilized in sodium hydroxide and treated with hydrogen peroxide until complete disappearance of the starting product.

The N-acetyl-L-Dopa (IV) formed, is not isolated, but extracted with an organic solvent such as acetone, and refluxed with an inorganic acid such as hydrobromic or hydrochloric acid, in the absence of air.

The compound is then purified to give L-Dopa (V) in highly active form.

The following example is given to illustrate invention, without limiting it.

EXAMPLE

L-β-(3,4-dihydroxyphenyl)-alanine

A flask was charged with 195.0 g. of L-tyrosine methylester and 600 g. of anhydrous pyridine. To this suspension 283 cc. of acetic anhydride were dropped, with stirring. The inner temperature was maintained at about 25° C. by cooling outside by a water bath. After 20 minutes of addition, the inner temperature reached 25° C. The mixture was stirred at room temperature for 4-5 hours, then dried in vacuo. The oil residue was dissolved in ethyl acetate and washed with diluted hydrochloric acid and then with water. The solvent was evaporated off and the nearly crystalline residue was taken up with 0.5 liter of hot ethyl acetate. Thereafter, 0.5 liter of petroleum ether was added to the solution which was allowed to crystallize. Thus, there was obtained 254 g.

of O,N-diacetyl-L-tyrosine methylester melting at 105–107° C.; $[\alpha]_D^{20}=+11.5$ (c.=3% in pyridine).

A 2 liter flask was charged with 600 cc. of nitrobenzene and 50.0 g. of O,N-diacetyl-L-tyrosine methylester. When the solution was complete, 60.0 g. of anhydrous aluminum chloride were added. The whole was heated with an oil bath of 125–130° C., for 4 hours. After 4 hours, the flask was cooled in a water bath and 560 cc. of water were added dropwise. The emulsion so obtained was poured into a 5 liter glass and 91.6 g. of anhydrous sodium carbonate was added little by little, under stirring. The basic suspension was brought into a 5 liter flask and nitrobenzene was steam distilled.

The gelatinous aluminum hydroxide was filtered off in the warm and the cake so formed was taken up with water several times. The basic filtrate, combined with the washings, was acidified with hydrochloric acid and extracted with ethyl acetate.

The organic residue, taken up with 150 cc. of ethyl acetate, crystallized to give 36 g. of L-β-(3-acetyl-4-hydroxyphenyl)-N-acetyl-alanine melting at 146–148° C.; $[\alpha]_D^{20}=+30.5°$ (c.=3% in pyridine).

35 cc. of 7.1% p/v hydrogen peroxide were added to a solution of 13.26 g. of L-β-(3-acetyl-4-hydroxyphenyl) N-acetyl-alanine in 115 cc. of a 1 N sodium hydroxide solution and the reaction mixture was maintained at room temperature for about 22–24 hours. When the reaction was over, the mixture so obtained was acidified with 19.15 cc. of hydrochloric acid and then concentrated in vacuo. The residue was taken up with hot acetone and the insoluble inorganic salts were filtered off on a sinter glass filter. The acetone extracts were combined and dried in vacuo.

The residue was taken up with 78 cc. of 48% hydrobromic acid and refluxed for two hours. After drying, the residue was taken up with 10 parts of boiled water and neutralized with about 120 cc. of 1 N sodium hydroxide.

At pH 5.5 the precipitation of L-β-(3,4-dihydroxyphenyl)-alanine takes place. There were obtained 7.2 g. of product melting at 275–276° C. (with decomposition); $[\alpha]_D^{20}=-11.5°$ (c.=1% in 1 N hydrochloric acid).

The intermediate L-β-(3-acetyl-4-hydroxyphenyl)-N-acetyl-alanine, prepared by our process is new.

We claim:

1. A process for the preparation of L-β-(3,4-dihydroxyphenyl)-alanine, which comprises treating L-tyrosine methylester with acetic anhydride at a temperature between 10° and 40° C., for a period of 2–5 hours, to give O,N-diacetyl-L-tyrosine methylester, reacting said O,N-diacetyl-L-tyrosine methylester with aluminum chloride, in the presence of a suitable organic solvent at a temperature between 100° and 150° C. for a period of 2–4 hours to yield β-(3-acetyl-4-hydroxyphenyl)N-acetyl-L-alanine, oxidizing said N-acetyl-L-alanine with hydrogen peroxide to yield N-acetyl-L-Dopa, hydrolyzing said N-acetyl-L-Dopa with a hot inorganic acid to yield L-β-(3,4-dihydroxyphenyl)-alanine.

2. The process of claim 1, wherein the organic solvent is selected from nitrobenzene and chlorobenzol.

3. The process of claim 1, wherein the inorganic acid is selected from hydrobromic and hydrochloric.

4. The process of claim 1, wherein the organic solvent is selected from nitrobenzene and chlorobenzol and the inorganic acid is selected from hydrobromic and hydrochloric.

References Cited
UNITED STATES PATENTS 3,553,258   1/1971   Kaiser et al. _____ 200—519

LORRAINE A. WEINBERGER, Primary Examiner

L. THAXTON, Assistant Examiner

UNITED STATES PATENT OFFICE
CERTIFICATE OF CORRECTION

Patent No. 3,717,673    Dated February 20, 1973

Inventor(s) Luigi Bernardi et al.

It is certified that error appears in the above-identified patent and that said Letters Patent are hereby corrected as shown below:

Column 1, line 7, "22,910/70" should read -- 22,910 A/70 --.

Signed and sealed this 26th day of February 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,717,673           Dated   February 20, 1973

Inventor(s)   Luigi Bernardi et al.

It is certified that error appears in the above-identified patent and that said Letters Patent are hereby corrected as shown below:

Column 1, structural formula (II), should appear as shown below:

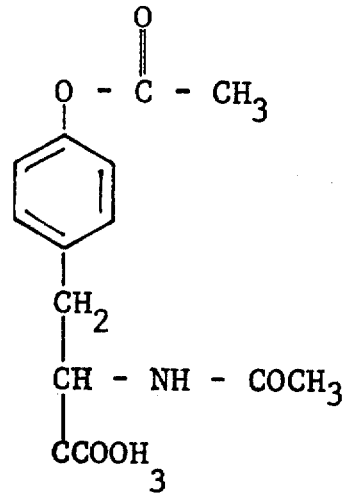

Signed and sealed this 8th day of October 1974.

(SEAL)
Attest:

McCOY M. GIBSON JR.                C. MARSHALL DANN
Attesting Officer                  Commissioner of Patents